United States Patent
Xu et al.

(10) Patent No.: US 12,431,942 B2
(45) Date of Patent: Sep. 30, 2025

(54) ANTENNA NUMBER CHANGE METHOD AND APPARATUS, DEVICE, AND STORAGE MEDIUM

(71) Applicant: ZTE CORPORATION, Shenzhen (CN)

(72) Inventors: Long Xu, Shenzhen (CN); Ying Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 157 days.

(21) Appl. No.: 18/262,104

(22) PCT Filed: Dec. 21, 2021

(86) PCT No.: PCT/CN2021/139960
§ 371 (c)(1),
(2) Date: Jul. 19, 2023

(87) PCT Pub. No.: WO2022/188505
PCT Pub. Date: Sep. 15, 2022

(65) Prior Publication Data
US 2024/0080068 A1    Mar. 7, 2024

(30) Foreign Application Priority Data
Mar. 10, 2021 (CN) .......................... 202110262345.4

(51) Int. Cl.
*H04B 7/06* (2006.01)
*H04B 7/0404* (2017.01)

(52) U.S. Cl.
CPC ......... *H04B 7/0404* (2013.01); *H04B 7/0608* (2013.01); *H04B 7/0691* (2013.01)

(58) Field of Classification Search
CPC ... H04B 7/00; H04B 7/04; H04B 7/06; H04B 7/08; H04B 7/0404; H04B 7/0426;
(Continued)

(56) References Cited

U.S. PATENT DOCUMENTS

| 2012/0063341 A1 | 3/2012 | Hamaguchi et al. |
| 2012/0088534 A1* | 4/2012 | Lee ................. H04B 7/0452 455/509 |

(Continued)

FOREIGN PATENT DOCUMENTS

| CN | 110912665 A | 3/2020 |
| CN | 110945944 A | 3/2020 |

(Continued)

OTHER PUBLICATIONS

International Searching Authority. International Search Report and Written Opinion for PCT Application No. PCT/CN2021/139960 and English translation, mailed Mar. 17, 2022, pp. 1-12.

(Continued)

*Primary Examiner* — Shawkat M Ali
(74) *Attorney, Agent, or Firm* — Vivacqua Crane, PLLC

(57) ABSTRACT

Disclosed are an antenna number change method, apparatus and device, and a storage medium. The antenna number change method, applied to a base station, may include: determining a number of uplink receiving antennas of the base station; determining, based on the number of uplink receiving antennas of the base station and a number of uplink transmitting antennas of a terminal device, whether the number of uplink receiving antennas of the base station is limited; and in response to the number of uplink receiving antennas of the base station being limited, transmitting an antenna number change instruction to the terminal device, the antenna number change instruction is used for instructing the terminal device to change the number of uplink transmitting antennas.

8 Claims, 2 Drawing Sheets

(58) Field of Classification Search
CPC .. H04B 7/0413; H04B 7/0608; H04B 7/0691;
H04W 8/24; H04W 24/02; H04W 28/08;
H04W 52/02; H04W 52/30; H04W 72/00;
H04W 72/04
USPC ................ 370/252, 311, 328–332, 341, 348;
375/291, 260, 262, 267, 295, 316
See application file for complete search history.

(56) References Cited

U.S. PATENT DOCUMENTS

| | | |
|---|---|---|
| 2013/0083757 A1 | 4/2013 | Kakishima et al. |
| 2016/0330681 A1 | 11/2016 | Yang et al. |
| 2019/0052345 A1 | 2/2019 | Yunoki |
| 2019/0132866 A1 | 5/2019 | Goto et al. |

FOREIGN PATENT DOCUMENTS

| | | |
|---|---|---|
| CN | 111416693 A | 7/2020 |
| WO | 2017145493 A1 | 8/2017 |
| WO | 2017175501 A1 | 10/2017 |

OTHER PUBLICATIONS

European Patent Office. Extended European Search Report for EP Application No. 21929967.4, mailed Apr. 19, 2024, pp. 1-7.

* cited by examiner

ANTENNA NUMBER CHANGE METHOD AND APPARATUS, DEVICE, AND STORAGE MEDIUM

CROSS-REFERENCE TO RELATED APPLICATION

This application is a national stage filing under 35 U.S.C. § 371 of international application number PCT/CN2021/139960, filed Dec. 21, 2021, which claims priority to Chinese patent application No. 202110262345.4, filed Mar. 10, 2021. The contents of these applications are incorporated herein by reference in their entirety.

TECHNICAL FIELD

The present disclosure relates to the technical field of digital signal processing and communication, and more particularly, to an antenna number change method, apparatus and device, and a storage medium.

BACKGROUND

In the era of 5G, massive MIMO has become the dominant form of outdoor base station devices. For instance, there are configurations such as 64 transmission and 64 reception (64T64R) and 32T32R. The majority of 5G terminal devices have a reception/transmission capability of 2T4R. In certain specific scenarios, such as cell blindness compensation, road coverage, and indoor coverage, small base station systems like 8T8R, 4T4R, 2T2R, and 1T1R are also deployed.

In general, 1T1R limits the base station side to support only single-stream transmission, and 2T2R limits the base station side to support at most 2-stream transmission. The limited reception/transmission capability on the base station side is not matched with the basic capability of 2T4R of 5G terminal devices, thus limiting the increase of the system capacity.

Indoor coverage is an important scene to be taken care of in the 5G era. Although a digitized indoor distribution system is a future development direction, due to the difficulty of construction and deployment and the scale of investment, a conventional Distributed Antenna System (DAS), i.e., an indoor system, will still play an important role in the 5G era. In the conventional DAS, one-path DASs (base station antenna 1T1R) and two-path DASs (base station antenna 2T2R) are mostly used, while multi-path DASs (base station antenna 4TR) are relatively rare. There is also a situation where a one-path DAS and a multi-path DAS are deployed in a single cell, and the number of receiving/transmitting antennas of the system needs to be determined according to the location of the terminal device.

In a scenario of multi-carrier overlapping coverage, the number of receiving/transmitting antennas on a different carrier base station side may be different. For example, the carrier 1 base station has a reception/transmission capability of 1T1R, the carrier 2 base station has a reception/transmission capability of 2TR, and the carrier 3 base station has a reception/transmission capability of 4TR. In a one-path DAS coverage area, the 5G terminal device uses 2 antennas for uplink transmission, but 2-stream transmission cannot be realized in the uplink, so that the system capacity cannot be effectively improved.

SUMMARY

The present disclosure provides an antenna number change method, apparatus and device, and a storage medium, which control, by a base station, a terminal device to reasonably distribute the number of transmitting antennas among multiple carriers of uplink carrier aggregation (CA), so as to realize the purpose of maximizing uplink traffic transmission.

In a first aspect, an embodiment of the present disclosure provides an antenna number change method, which is applied to a base station. The method includes: determining a number of uplink receiving antennas of the base station; determining, based on the number of uplink receiving antennas of the base station and a number of uplink transmitting antennas of a terminal device, whether the number of uplink receiving antennas of the base station is limited; and, in response to the number of uplink receiving antennas of the base station being limited, transmitting an antenna number change instruction to the terminal device, the antenna number change instruction is used for instructing the terminal device to change the number of uplink transmitting antennas.

In a second aspect, an embodiment of the present disclosure provides an antenna number change method, which is applied to a terminal device. The method includes: receiving an antenna number change instruction transmitted by a base station, the antenna number change instruction includes a number of uplink transmitting antennas after a change; and, controlling the number of transmitting antennas to be changed to the number of uplink transmitting antennas after the change.

In a third aspect, an embodiment of the present disclosure provides an antenna number change apparatus, which is configured in a base station. The apparatus includes a base station uplink receiving antenna number change module, an antenna number limitation determination module and an antenna number change instruction transmitting module. The base station uplink receiving antenna number change module is configured to determine a number of uplink receiving antennas of the base station; the antenna number limitation determination module is configured to determine, based on the number of uplink receiving antennas of the base station and a number of uplink transmitting antennas of a terminal device, whether the number of uplink receiving antennas of the base station is limited; and, the antenna number change instruction transmitting module is configured to, in response to the number of uplink receiving antennas of the base station being limited, transmit an antenna number change instruction to the terminal device. The antenna number change instruction is used for instructing the terminal device to change the number of uplink transmitting antennas.

In a fourth aspect, an embodiment of the present disclosure provides an antenna number change device. The device includes one or more processors, and a memory storing one or more programs which, when executed by the one or more processors, cause the one or more processors to implement any one of the above antenna number change methods.

In a fifth aspect, an embodiment of the present disclosure provides a computer storage medium, storing a computer program which, when executed by a processor, causes the processor to implement any one of the above antenna number change methods.

More descriptions of the above embodiments and other aspects of the present disclosure and the implementations thereof will be provided in the accompanying drawings, the description, and the claims.

DETAILED DESCRIPTION

Figure 1:
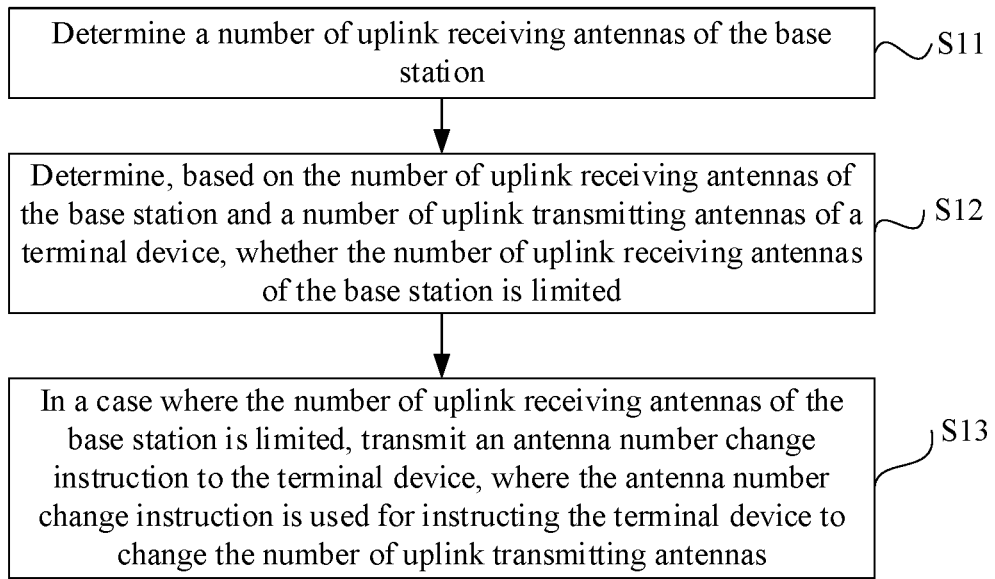
FIG. 1 is a flowchart of an antenna number change method according to an embodiment of the present disclosure.

To make the objectives, technical schemes and advantages of the present disclosure clear, the embodiments of the present disclosure will be described below in detail in conjunction with the accompanying drawings. It is to be noted that the embodiments in the present disclosure and the features in the embodiments can be arbitrarily combined with each other if not conflicted.

The steps shown in the flowcharts in the accompanying drawings can be executed in a computer system, for example, a set of computer-executable instructions. In addition, although a logic order is shown in the flowcharts, in some cases, the steps shown or described can be executed in a different order than this logic order.

The technical schemes of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a Universal Mobile Telecommunication System (UMTS), a 5th generation wireless system (5G), etc., which will not be limited in the embodiments of the present disclosure. The description will be given by taking a 5G system as an example in the present disclosure.

In the embodiments of the present disclosure, the base station may be a device capable of communicating with a user terminal device. The base station may be any device with a wireless reception/transmission function, including but not limited to, a base station NodeB, an evolved base station eNodeB, a base station in 5G communication systems, a base station in future communication systems, an access node in WiFi systems, a wireless relay node, a wireless backhaul node, etc. The base station may also be a wireless controller in the Cloud Radio Access Network (CRAN) scenario; or, the base station may also be a small station, a Transmission Reference Point (TRP), etc., which will not be limited in the embodiments of the present disclosure. The description will be given by taking a 5G base station as an example in the present disclosure.

In the embodiments of the present disclosure, the user terminal device is a device with a wireless reception/transmission function, which may be deployed on land, including indoor or outdoor, handheld, wearable or vehicle-mounted devices; or, may be deployed on the water (e.g., ships, etc.); or, may be deployed in the air (e.g., airplanes, balloons, satellites, etc.). The user terminal device may be a mobile phone, a tablet computer (Pad), a computer with a wireless reception/transmission function, a Virtual Reality (VR) terminal device, an Augmented Reality (AR) terminal device, a wireless terminal device in industrial control, a wireless terminal device in self-driving, a wireless terminal device in remote medical, a wireless terminal device in the smart grid, a wireless terminal device in transportable safety, a wireless terminal device in the smart city, a wireless terminal device in the smart home, etc. The application scenario will not be limited in the embodiments of the present disclosure. The user terminal device may be sometimes called a terminal device, an access terminal device, a UE unit, a UE station, a mobile station, a mobile platform, a remote station, a remote terminal device, a mobile device, a UE terminal device, a wireless communication apparatus, a UE agent, a UE apparatus, etc., which will not be limited in the embodiments of the present disclosure.

In a scenario of multi-carrier overlapping coverage, during uplink carrier aggregation (CA), the uplink capacity can be maximized by adaptively controlling a number of uplink transmitting antennas of the terminal device in different areas covered by DAS according to the number of effective uplink receiving antennas on the base station side. In a scenario where there may be no need for multi-antenna transmission of the terminal device, the purpose of saving the power consumption of the terminal device can also be achieved by controlling a number of uplink transmitting antennas of the terminal device.

The uplink carrier aggregation technology of 5G Release 16 has been further improved. The terminal device supports multiple uplink CA operation modes. The terminal device with 2-antenna transmitting capability can be switched by a transmitter to realize uplink time division duplexing (TDD) 2-stream and frequency division duplexing (FDD) 1-stream: (1) time division transmission, TDD 2-stream+FDD 1-stream; (2) time division transmission, TDD 1-stream+FDD 1-stream; and, (3) concurrent transmission, TDD 1-stream+FDD 1-stream.

In the indoor DAS system, in a case where the number of effective uplink receiving antennas of the base station may be limited, it is to determine whether to select two antennas or a single antenna for transmission on different carriers. If the uplink channel condition will lead to an unsatisfactory transmission effect of uplink 2-stream, for example high channel correlation and poor far-channel quality the adoption of the time division transmission mode of TDD 2-stream+FDD 1-stream will also lead to a lower uplink rate than the adoption of TDD 1-stream+FDD 1-stream concurrent transmission. In addition, carrier bandwidth is also a factor to be considered. Therefore, in the case of multiple carriers, to maximize the uplink transmission rate of the terminal device, an effective method may be needed to control the antenna distribution of the terminal device on different carriers.

The antenna number change method, apparatus and device and the storage medium will be described below in detail by embodiments.

In an embodiment, an antenna number change method is provided. The method is applied to a base station. The antenna number change is suitable for controlling the antenna distribution of the terminal device on different carriers in a scenario of multi-carrier overlapping coverage. As shown in FIG. 1, the antenna number change method provided in the embodiment of the present disclosure mainly includes following steps of S11, S12 and S13.

At S11, a number of uplink receiving antennas of the base station is determined.

At S12, it is determined, based on the number of uplink receiving antennas of the base station and a number of uplink transmitting antennas of a terminal device, whether the number of uplink receiving antennas of the base station is limited.

At S13, in a case where the number of uplink receiving antennas of the base station is limited, an antenna number change instruction is transmitted to the terminal device, where the antenna number change instruction is used for instructing the terminal device to change the number of uplink transmitting antennas.

The number of uplink receiving antennas of the base station being limited means that the number of effective uplink receiving antennas on the base station side cannot satisfy the number of uplink transmitting antennas of the terminal device on the aggregated carrier (CA) or the maximum number of uplink transmitting antennas configurable by the terminal device on the CA. The antenna number change instruction includes the number of uplink transmitting antennas after the change by the terminal device.

In a case where the number of uplink receiving antennas of the base station is limited, an effective distribution of the number of uplink transmitting antennas of the terminal device on different carriers of uplink CA can be reasonably controlled to maximize the uplink traffic transmission.

In this embodiment, it is determined by the base station whether the number of uplink receiving antennas of the base station is limited, and an antenna number change instruction is transmitted to the terminal device if the base station determines that the number of uplink receiving antennas of the base station is limited. Upon receiving the antenna number change instruction, the terminal device changes a current number of uplink transmitting antennas to the number of uplink transmitting antennas after the change.

In an embodiment, determining, based on the number of uplink receiving antennas of the base station and a number of uplink transmitting antennas of a terminal device, whether the number of uplink receiving antennas of the base station is limited includes:

if the number of uplink receiving antennas of the base station is less than a number of uplink transmitting antennas of the terminal device on an aggregated carrier, determining that the number of uplink receiving antennas of the base station is limited.

In an embodiment, the number of uplink receiving antennas AntNumCellRx(i) of the base station is compared with the number of uplink transmitting antennas AntNumCAUE-CATx(i) of the uplink CA of the terminal device on this carrier. If the number of uplink receiving antennas AntNumCellRx(i) of the base station is less than the number of uplink transmitting antennas AntNumUECATx(i) of the uplink CA of the terminal device on this carrier or the maximum number of uplink transmitting antennas configurable by the terminal device on this carrier of the CA, it is considered that the number of effective uplink receiving antennas of the base station on this carrier is limited. The number of uplink receiving antennas of the base station refers to the number of effective uplink receiving antennas of the base station.

In an embodiment, according to the current 3GPP technical document, it is to pay attention to whether the number of uplink receiving antennas of the base station configured on a TDD uplink carrier of a cell is less than 2; and, if the number of uplink receiving antennas of the base station is less than 2, it is considered that the number of uplink receiving antennas on the TDD carrier is limited.

In an embodiment, determining, based on the number of uplink receiving antennas of the base station and a number of uplink transmitting antennas of a terminal device, whether the number of uplink receiving antennas of the base station is limited includes:

if the number of uplink receiving antennas of the base station is less than the maximum number of uplink transmitting antennas configurable by the terminal device on an aggregated carrier, determining that the number of uplink receiving antennas of the base station is limited.

In an embodiment, the number of uplink receiving antennas AntNumCellRx(i) of the base station is compared with the number of uplink transmitting antennas AntNumCAUE-CATx(i) of the uplink CA of the terminal device on this carrier; and, if the number of uplink receiving antennas AntNumCellRx(i) of the base station is less than the maximum number of uplink transmitting antennas configurable by the uplink CA of the terminal device on this carrier, it is considered that the number of effective uplink receiving antennas of the base station on this carrier is limited. The number of uplink receiving antennas of the base station refers to the number of effective uplink receiving antennas of the base station.

In an embodiment, determining a number of uplink receiving antennas of the base station includes:

determining the number of uplink receiving antennas of the base station based on a received power of each uplink antenna.

The received power of each uplink antenna is measured during data transmission between the base station and the terminal device.

In this embodiment, the received power of each uplink antenna is compared with a power threshold, and the number of antennas with the received power greater than the power threshold is changed to the number of uplink receiving antennas of the base station. The number of uplink receiving antennas of the base station may refer to the number of effective uplink receiving antennas of the base station.

In an embodiment, determining a number of uplink receiving antennas of the base station includes:

determining the number of uplink receiving antennas of the base station based on a signal quality received by uplink base station receiving antennas.

In this embodiment, in the indoor distribution coverage system, since the antenna distribution is different in different areas, the base station may determine the number of effective uplink receiving antennas AntNumCellRx(i) of the base station based on the signal quality (e.g., SINR, etc.) received by uplink receiving antennas of the base station. Then, the base station transmits the number of effective uplink receiving antennas of the base station to the terminal device side.

The signal quality received by uplink receiving antennas of the base station is measured in the process of receiving an uplink transmission signal of the terminal device by the base station. The signal quality includes one or more of Signal to Interference plus Noise Ratio (SINR), Reference Signal Receiving Quality (RSRQ), and Received Signal Strength Indication (RSSI).

In this embodiment, the signal quality received by each uplink receiving antenna is compared with a signal quality threshold, and the number of antennas with the signal quality higher than the signal quality threshold is changed to the number of uplink receiving antennas of the base station.

In an embodiment, prior to transmitting the antenna number change instruction to the terminal device, the method further includes:

in a case where a transmitting power of uplink transmitting antennas of the terminal device is not limited, determining that the number of uplink transmitting antennas after the change by the terminal device is less than or equal to the number of uplink receiving antennas of the base station.

In this embodiment, when determining whether to change the number of uplink transmitting antennas of the uplink CA of the terminal device, it is first determined whether the number of uplink receiving antennas on each carrier is limited.

For a carrier with a limited number of uplink receiving antennas of the base station, it is to adjust the number of transmitting antennas of the uplink CA of the terminal device on this carrier to be less than or equal to the number of uplink receiving antennas of the base station. Thus, the uplink carrier aggregation traffic is maximized. That is, it is simplified to maximize the value of the formula "Σ(effective uplink bandwidth of carrier i×number of transmitting antennas of terminal device on carrier i of uplink CA)".

In an embodiment, prior to transmitting the antenna number change instruction to the terminal device, the method further includes:

with the purpose of maximizing the uplink carrier aggregation traffic, determining, based on the number of effective uplink receiving antennas of the base station, the effective uplink bandwidth and the uplink channel condition, a number of antennas after the change by the terminal device.

In this embodiment, the base station acquires the effective uplink bandwidth of carriers, calculates, according to the number of uplink receiving antennas of the base station on each carrier and the uplink channel condition of each carrier, the maximum rate that can be obtained by the terminal device by utilizing a different number of transmitting antennas on each carrier, and determine the number of uplink transmitting antennas used by the terminal device on each carrier, with the purpose of maximizing the uplink carrier aggregation traffic.

Figure 2:
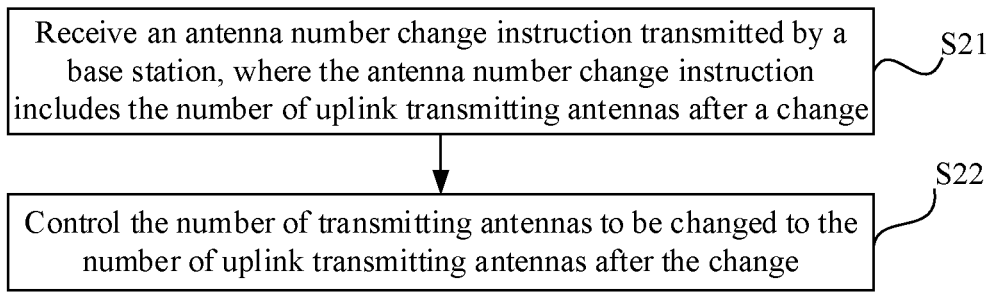
FIG. 2 is a flowchart of an antenna number change method according to an embodiment of the present disclosure.

In an embodiment, an antenna number change method is provided. The method is applied to a terminal device. The antenna number change is suitable for controlling the antenna distribution of the terminal device on different carriers in a scenario of multi-carrier overlapping coverage. As shown in FIG. 2, the antenna number change method provided in the embodiment of the present disclosure mainly includes the following steps of S21 and S22.

At S21, an antenna number change instruction transmitted by a base station is received, where the antenna number change instruction includes a number of uplink transmitting antennas after a change.

At S22, the number of transmitting antennas is controlled to be changed to the number of uplink transmitting antennas after the change.

In this embodiment, it is determined by the base station whether the number of uplink receiving antennas of the base station is limited, and an antenna number change instruction is generated and transmitted to the terminal device if the base station determines that the number of uplink receiving antennas of the base station is limited. Upon receiving the antenna number change instruction, the terminal device changes a current number of uplink transmitting antennas to the number of uplink transmitting antennas after the change.

For example, if the number of uplink transmitting antennas after the change is 2 and the current number of uplink transmitting antennas of the terminal device is 1, the terminal device changes the number of uplink transmitting antennas from 1 to 2 upon receiving the antenna number change instruction.

In an embodiment, a method for controlling a terminal device to reasonably distribute a number of transmitting antennas among multiple carriers of uplink CA based on a number of uplink receiving antennas and in combination with other information is provided to achieve the purpose of maximizing the uplink traffic transmission.

In the indoor distribution system, the base station detects the number of uplink receiving antennas on different carriers of uplink CA, and compares the detected number with the number of uplink transmitting antennas distributed by the terminal device on different carriers of uplink CA to determine whether the number of uplink receiving antennas on different carriers of uplink CA is limited. According to whether the number of uplink receiving antennas on different carriers of uplink CA is limited, and in combination with the effective uplink bandwidth of different carriers, an uplink power margin of the terminal device, uplink service requirements of the terminal device or the like, it is determined whether to control the terminal device to change the number of uplink transmitting antennas. The terminal device changes the number of uplink transmitting antennas as required, to achieve the purpose of maximizing the uplink traffic transmission.

In an implementation, in the indoor distribution coverage system, it is determined whether the number of uplink receiving antennas of the base station on different carriers of uplink CA is limited. The number of uplink receiving antennas AntNumCellRx(i) of the base station can be determined according to the number of antennas configured by a cell and a received power of each uplink antenna.

In an implementation, the number of uplink receiving antennas AntNumCellRx(i) of the base station is compared with the number of uplink transmitting antennas AntNumCAUECATx(i) of the uplink CA of the terminal device on this carrier. If the number of uplink receiving antennas AntNumCellRx(i) of the base station is less than the number of uplink transmitting antennas AntNumUECATx(i) of the uplink CA of the terminal device on this carrier, it is considered that the effective number of uplink receiving antennas of the base station on this carrier is limited. According to the current 3GPP technical document, it is to pay attention to whether the number of uplink receiving antennas configured on a TDD uplink carrier of a cell is less than 2; and, if the number of uplink receiving antennas is less than 2, it is considered that the number of effective uplink receiving antennas on the TDD carrier is limited.

In another implementation, the number of uplink receiving antennas AntNumCellRx(i) of the base station is compared with the number of uplink transmitting antennas AntNumCAUECATx(i) of the uplink CA of the terminal device on this carrier. If the number of uplink receiving antennas AntNumCellRx(i) of the base station is less than the maximum number of uplink transmitting antennas configurable by the terminal device on this carrier of the CA, it is considered that the number of effective uplink receiving antennas of the base station on this carrier is limited.

When determining whether to change the number of uplink transmitting antennas of the uplink CA of the terminal device, the base station first determines whether the number of uplink receiving antennas on each carrier is limited. For a carrier with a limited number of uplink receiving antennas of the base station, it is to adjust the number of transmitting antennas of the uplink CA of the terminal device on this carrier to not exceed the number of receiving antennas of the base station; with the purpose of maximizing the uplink carrier aggregation traffic, it may to maximize the value of the formula "Σ(effective uplink bandwidth of carrier i×number of transmitting antennas of terminal device on carrier i of uplink CA)".

For example, in the indoor distribution coverage system, the number of uplink receiving antennas of the base station on an FDD NR carrier in the coverage area is 1, and the number of uplink transmitting antennas of the base station on a TDD NR carrier is 1. In this case, the uplink CA of the terminal device may be controlled to adopt a concurrent mode in the FDD carrier and the TDD carrier and use 1 antenna on each of the FDD carrier and the TDD carrier, so that the uplink carrier aggregation traffic is maximized.

In an implementation, in the indoor distribution coverage system, since the antenna distribution is different in different areas, the number of uplink receiving antennas AntNumCellRx(i) of the base station may be determined according to the signal quality (e.g., received power, SINR, etc.) received by uplink receiving antennas of the base station.

In an implementation, the number of uplink receiving antennas AntNumCellRx(i) of the base station is compared with the number of transmitting antennas AntNumCAUECATx(i) of the uplink CA of the terminal device on this carrier. If the number of uplink receiving antennas AntNumCellRx(i) of the base station is less than the number of uplink transmitting antennas AntNumUECATx(i) of the uplink CA of the terminal device on this carrier or the maximum number of uplink transmitting antennas configurable by the terminal device on this carrier of the CA, it is considered that the number of effective uplink receiving antennas of the base station on this carrier is limited. According to the current 3GPP technical document, it is to pay attention to whether the number of uplink receiving antennas configured on a TDD uplink carrier of a cell is less than 2; and, if the number of uplink receiving antennas is less than 2, it is considered that the number of uplink receiving antennas on the TDD carrier is limited.

When determining whether to change the number of transmitting antennas of the uplink CA of the terminal device, the base station first determines whether the number of effective uplink receiving antennas on each carrier is limited. For a carrier with a limited number of uplink receiving antennas of the base station, it is to adjust the number of uplink transmitting antennas of the uplink CA of the terminal device on this carrier to not exceed the number of effective receiving antennas of the base station, to maximize the value of "Σ(effective uplink bandwidth of carrier i×number of transmitting antennas of terminal device on carrier i of uplink CA)".

In an implementation, considering the factors such as whether the uplink power of the terminal device is limited, the loads occupied by other users on different carriers being different, the size of uplink service data amount demanded by the terminal device, differences in uplink received signal quality of different carriers and the like, a different coefficient $A_i$ may be added to different carriers, to maximize the value of "Σ(effective uplink bandwidth of carrier i×number of transmitting antennas of terminal device on carrier i of uplink CA)", such that the terminal device can obtain the maximum uplink transmission rate.

For example, in the indoor distribution coverage system, the number of uplink receiving antennas of the base station on an FDD NR carrier in the coverage area is 1, and the number of uplink transmitting antennas of the base station on a TDD NR carrier is 2. If the FDD NR carrier has a bandwidth of 10 M, it is considered that the effective uplink bandwidth is 10 M; and, if the TDD NR carrier has a bandwidth of 100 M and uplink sub-frames occupy 30% of the bandwidth, it is considered that the effective uplink bandwidth is 30 M (100*30%). The uplink power of the terminal device on each carrier is not limited, the uplink channel condition of the TDD carrier can satisfy the requirements of two-stream transmission, and the effective coefficients $A_i$ of the TDD and FDD carriers are 1. In this case, the uplink CA of the terminal device may be controlled to use 2 antennas for transmission on the TDD carrier, use 1 antenna for transmission on the FDD carrier and adopt a time division mode to transmit data on the FDD carrier and the TDD carrier, such that the uplink carrier aggregation traffic can be maximized.

Figure 3:
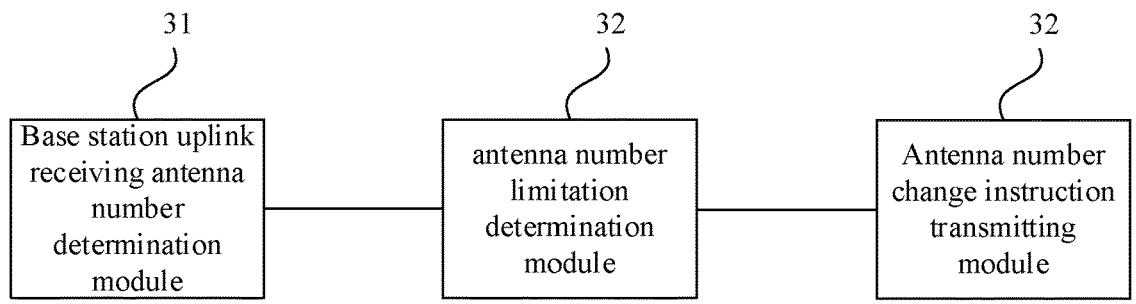
FIG. 3 is a schematic diagram of an antenna number change apparatus according to an embodiment of the present disclosure.

In an embodiment, an antenna number change apparatus is provided. The apparatus is configured in a base station. The antenna number change apparatus is suitable for controlling antenna distribution of a terminal device on different carriers in a scenario of multi-carrier overlapping coverage. As shown in FIG. 3, the antenna number change apparatus provided in the embodiment of the present disclosure mainly includes a base station uplink receiving antenna number change module 31, an antenna number limitation determination module 32 and an antenna number change instruction transmitting module 33.

The base station uplink receiving antenna number change module is configured to determine a number of uplink receiving antennas of the base station.

The antenna number limitation determination module is configured to determine, based on the number of uplink receiving antennas of the base station and a number of uplink transmitting antennas of a terminal device, whether the number of uplink receiving antennas of the base station is limited.

The antenna number change instruction transmitting module is configured to, in a case where the number of uplink receiving antennas of the base station is limited, transmit an antenna number change instruction to the terminal device, where the antenna number change instruction is used for instructing the terminal device to change the number of uplink transmitting antennas.

In an implementation, determining, based on the number of uplink receiving antennas of the base station and a number of uplink transmitting antennas of a terminal device, whether the number of uplink receiving antennas of the base station is limited includes:
  if the number of uplink receiving antennas of the base station is less than the number of uplink transmitting antennas of the terminal device on an aggregated carrier, determining that the number of uplink receiving antennas of the base station is limited.

In an implementation, determining, based on the number of uplink receiving antennas of the base station and a number of uplink transmitting antennas of a terminal device, whether the number of uplink receiving antennas of the base station is limited includes:
  if the number of uplink receiving antennas of the base station is less than the maximum number of uplink transmitting antennas configurable by the terminal device on an aggregated carrier, determining that the number of uplink receiving antennas of the base station is limited.

In an implementation, determining a number of uplink receiving antennas of the base station includes:
  determining the number of uplink receiving antennas of the base station based on a received power of each uplink antenna.

In an implementation, determining a number of uplink receiving antennas of the base station includes:

determining the number of uplink receiving antennas of the base station based on a signal quality received by uplink receiving antennas of the base station.

In an implementation, prior to transmitting the antenna number change instruction to the terminal device, the method further includes:

in a case where a transmitting power of uplink transmitting antennas of the terminal device is not limited, determining that a number of uplink transmitting antennas after the change by the terminal device is less than or equal to the number of uplink receiving antennas of the base station.

In an implementation, prior to transmitting the antenna number change instruction to the terminal device, the method further includes:

with the purpose of maximizing the uplink carrier aggregation traffic, determining, based on the number of effective uplink receiving antennas of the base station, an effective uplink bandwidth and the uplink channel condition, the number of uplink transmitting antennas after the change by the terminal device.

The antenna number change apparatus provided in this embodiment can implement the antenna number change method provided in any one of the embodiments of the present disclosure, and has the corresponding functional modules and beneficial effects of implementing this method. For technical details not described in this embodiment, reference may be made to the antenna number change method provided in any one of the embodiments of the present disclosure.

It is to be noted that, in the embodiments of the antenna number change apparatus, the units and modules included are divided according to a functional logic, and there is no limitation to the division manner as long as corresponding functions can be realized. In addition, the specific name of each functional unit is merely for distinguishing the functional units from each other, and is not intended to limit the protection scope of the present disclosure.

Figure 4:
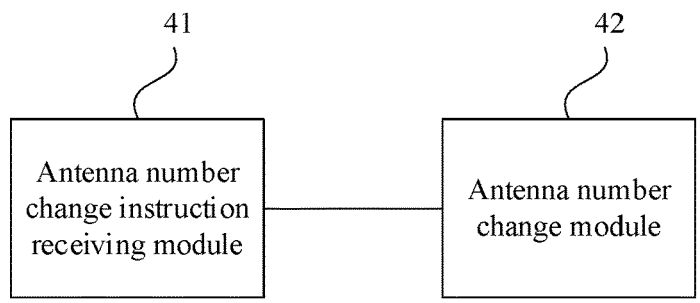
FIG. 4 is a schematic diagram of an antenna number change apparatus according to an embodiment of the present disclosure.

In an embodiment, an antenna number change apparatus is provided. The apparatus is configured in a terminal device. The antenna number change apparatus is suitable for controlling antenna distribution of a terminal device on different carriers in a scenario of multi-carrier overlapping coverage. As shown in FIG. 4, the antenna number change apparatus provided in the embodiment of the present disclosure mainly includes an antenna number change instruction receiving module 41 and an antenna number change module 42.

The antenna number change instruction receiving module 41 is configured to receive an antenna number change instruction transmitted by a base station, where the antenna number change instruction includes a number of uplink transmitting antennas after a change.

The antenna number change module 42 is configured control a number of transmitting antennas to be changed to the number of uplink transmitting antennas after the change.

The antenna number change apparatus provided in this embodiment can implement the antenna number change method provided in any one of the embodiments of the present disclosure, and has corresponding functional modules and beneficial effects of implementing this method. For technical details not described in this embodiment, reference may be made to the antenna number change method provided in any one of the embodiments of the present disclosure.

It is to be noted that, in the embodiments of the antenna number change apparatus, the units and modules included are only divided according to a functional logic, and there is no limitation to the division manner as long as corresponding functions can be realized. In addition, a specific name of each functional unit is merely for distinguishing the functional units from each other, and is not intended to limit the protection scope of the present disclosure.

Figure 5:
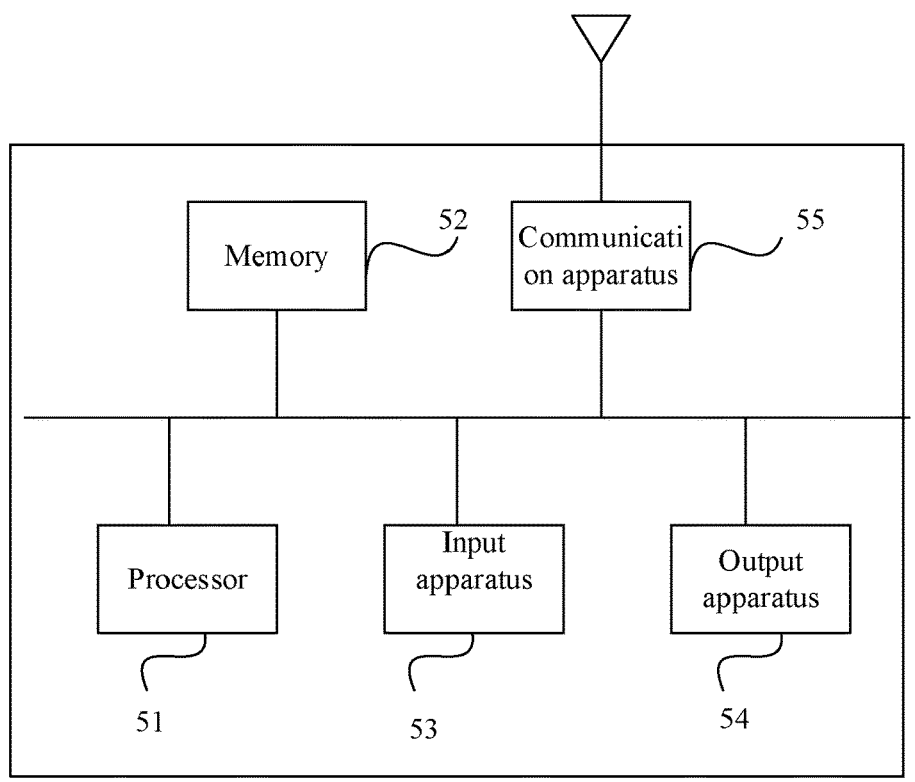
FIG. 5 is a schematic diagram of an antenna number change device according to an embodiment of the present disclosure.

An embodiment of the present disclosure further provides a device. FIG. 5 is a schematic structural diagram of a device according to an embodiment of the present disclosure. As shown in FIG. 5, the device includes a processor 51, a memory 52, an input apparatus 53, an output apparatus 54 and a communication apparatus 55. The number of the processor 51 in the device may be one or more, and one processor 51 is taken an example in FIG. 5. The processor 51, the memory 52, the input apparatus 53 and the output apparatus 54 in the device may be connected via a bus or in other ways, and the processor 51, the memory 52, the input apparatus 53 and the output apparatus 54 in the device being connected via a bus is taken as an example.

As a computer-readable storage medium, the memory 52 may be configured to store software programs, computer-executable programs and modules, for example, program instructions/modules corresponding to the method in the embodiments of the present disclosure. The processor 52 executes the software programs, instructions and modules stored in the memory 51, to perform various functional applications and data processing of the device, so as to implement the method according to any one of the embodiments of the present disclosure.

The memory 52 may mainly include a program storage region and a data storage region. The program storage region can store application programs required by an operating system and at least one function. The data storage region can store data created according to the use of the device, etc. In addition, the memory 52 may include high-speed random access memories, or may include non-volatile memories, such as at least one magnetic disk memory device, flash memory devices or other non-volatile solid-state memory devices. In some examples, the memory 52 may further include memories remotely located relative to the processor 51, and these remote memories may be connected to the device via a network. Examples of the network include, but not limited to, the Internet, an intranet, a local area network, a mobile communication network and combinations thereof.

The input apparatus 53 may be configured to receive input digit or character information and generate a key signal input related to user settings and function control of the device. The output apparatus 54 may include a display screen or other display devices.

The communication apparatus 55 may include a receiver and a transmitter. The communication apparatus 55 is configured to perform information reception/transmission communication according to the control of the processor 51.

In an implementation, an embodiment of the present disclosure further provides a storage medium, storing a computer-executable instruction which, when executed by a computer processor, causes the computer processor to implement an antenna number change method. The method is applied to a base station, and includes:

determining a number of uplink receiving antennas of the base station;

determining, based on the number of uplink receiving antennas of the base station and a number of uplink transmitting antennas of a terminal device, whether the number of uplink receiving antennas of the base station is limited; and in a case where the number of uplink receiving antennas of the base station is limited, transmitting an antenna number change instruction to the terminal device, where the antenna number change instruction is used for instructing the terminal device to change the number of uplink transmitting antennas.

Certainly, in the storage medium storing a computer-executable instruction provided in the embodiment of the present disclosure, the computer-executable instruction is not limited to implementing the method operations described above, and can also implement related operations in the antenna number change method provided in any one of the embodiments of the present disclosure.

In an implementation, an embodiment of the present disclosure further provides a storage medium, storing a computer-executable instruction which, when executed by a computer processor, causes the computer processor to implement an antenna number change method. The method is applied to a terminal device, and includes:

receiving an antenna number change instruction transmitted by a base station, where the antenna number change instruction including a number of uplink transmitting antennas after a change; and controlling a number of transmitting antennas to be changed to the number of uplink transmitting antennas after the change.

Certainly, in the storage medium storing a computer-executable instruction provided in the embodiment of the present disclosure, the computer-executable instruction is not limited to implementing the method operations described above, and can also implement related operations in the antenna number change method provided in any one of the embodiments of the present disclosure.

From the foregoing description of the implementations, it should be clearly understood by those having ordinary skills in the art that the present disclosure may be implemented by software and necessary general-purpose hardware. Certainly, the present disclosure may also be implemented by hardware. However, in many cases, the former is a better implementation. Based on this understanding, the technical schemes of the present disclosure may be substantially embodied in the form of a software product, or a part of the present disclosure that contributes to the existing technology may be embodied in the form of a software product. The computer software product may be stored in a computer-readable storage medium, for example, a floppy disk, Read-Only Memories (ROMs), Random Access Memories (RAMs), flash memories (FLASH), hard disks, optical disks or the like of computers, and includes a plurality of instructions which, when executed by a computer device (which may be a personal computer, a server, a network device, etc.), cause the computer device to execute the method described in the above embodiments of the present disclosure.

The foregoing description merely shows the embodiments of the present disclosure, and is not intended to limit the protection scope of the present disclosure.

It should be understood by those having ordinary skills in the art that the term "user terminal device" encompasses any suitable type of wireless user equipment, for example, mobile phones, portable data processing apparatuses, portable web browsers or vehicle-mounted mobile stations.

Generally, various embodiments of the present disclosure may be implemented in hardware or dedicated circuits, software, logics or any combinations thereof. For example, some aspects may be implemented in hardware, while other aspects may be implemented in firmware or software that can be executed by a controller, a microprocessor or other computing apparatuses, although the present disclosure is not limited thereto.

The embodiments of the present disclosure may be implemented by executing computer program instructions by a data processor of a mobile device, for example, in a processor entity, or by hardware, or by a combination of software and hardware. The computer program instructions may be assembly instructions, Instruction Set Architecture (ISA) instructions, machine instructions, machine-related instructions, microcodes, firmware instructions, state setting data, or source codes or target codes written in any combination of one or more programming languages.

The blocks of any logic flow in the accompanying drawings of the present disclosure may represent program steps, or may represent interconnected logic circuits, modules and functions, or may represent combinations of program steps and logic circuits, modules or functions. The computer programs may be stored on a memory. The memory may be of any type suitable for the local technical environment and may be implemented by utilizing any suitable data storage technology, for example, but not limited to, a Read-Only Memories (ROMs), Random Access Memories (RAMs), optical memory devices and systems (Digital Versatile Disks (DVDs) or CDs), etc. The computer-readable medium may include non-transient storage mediums. The data processor may be of any type suitable for the local technical environment, for example, but not limited to, general purpose computers, special purpose computers, microprocessors, Digital Signal Processors (DSPs), Application Specific Integrated Circuits (ASICs), Programmable Logic Devices (FGPAs), and processors based on a multi-core processor architecture.

The detailed description of the embodiments of the present disclosure has been provided above by way of non-limiting examples. However, considering the accompanying drawings and the claims, various modifications and adjustments to the foregoing embodiments are apparent for those having ordinary skills in the art without departing from the scope of the present disclosure. Therefore, the appropriate scope of the present disclosure will be defined by the claims.

What is claimed is:

1. An antenna number change method, applied to a base station, the method comprising:

determining a number of uplink receiving antennas of the base station;

determining, based on the number of uplink receiving antennas of the base station and a number of uplink transmitting antennas of a terminal device, whether the number of uplink receiving antennas of the base station is limited;

with a purpose of maximizing uplink carrier aggregation traffic, determining, based on a number of effective uplink receiving antennas of the base station, an effective uplink bandwidth and uplink channel condition, the number of uplink transmitting antennas after a change by the terminal device; and in response to the number of uplink receiving antennas of the base station being limited, transmitting an antenna number change instruction to the terminal device, wherein the antenna number change instruction is used for instructing the terminal device to change the number of uplink transmitting antennas.

2. The method of claim 1, wherein determining, based on the number of uplink receiving antennas of the base station and the number of uplink transmitting antennas of the terminal device, whether the number of uplink receiving antennas of the base station is limited comprises:

in response to the number of uplink receiving antennas of the base station being less than the number of uplink transmitting antennas of the terminal device on an aggregated carrier, determining that the number of uplink receiving antennas of the base station is limited.

3. The method of claim 1, wherein determining, based on the number of uplink receiving antennas of the base station and the number of uplink transmitting antennas of the terminal device, whether the number of uplink receiving antennas of the base station is limited comprises:

in response to the number of uplink receiving antennas of the base station being less than a maximum number of the uplink transmitting antennas configurable by the terminal device on an aggregated carrier, determining that the number of uplink receiving antennas of the base station is limited.

4. The method of claim 1, wherein determining the number of uplink receiving antennas of the base station comprises:

determining the number of uplink receiving antennas of the base station based on a received power of each uplink antenna, or determining the number of uplink receiving antennas of the base station based on a signal quality received by uplink receiving antennas of the base station.

5. The method of claim 1, prior to transmitting the antenna number change instruction to the terminal device, further comprising:

in response to a transmitting power of the uplink transmitting antennas of the terminal device being not limited, determining that the number of uplink transmitting antennas after the change by the terminal device is less than or equal to the number of uplink receiving antennas of the base station.

6. A non-transitory computer-readable storage medium, storing a computer program which, when executed by a processor, causes the processor to perform the antenna number change method of claim 1.

7. An antenna number change method, applied to a terminal device, the method comprising:

receiving an antenna number change instruction transmitted by a base station, wherein the antenna number change instruction comprises a number of uplink transmitting antennas after a change;

with a purpose of maximizing uplink carrier aggregation traffic, determining, based on a number of effective uplink receiving antennas of the base station, an effective uplink bandwidth and uplink channel condition, the number of uplink transmitting antennas for different carriers after the change by the terminal device; and controlling a number of transmitting antennas to be changed to the number of uplink transmitting antennas for the different carriers after the change.

8. An antenna number change device, the device comprising:

one or more processors; and a memory storing one or more programs;

wherein the one or more programs, when executed by the one or more processors, cause the one or more processors to perform an antenna number change method, applied to a base station, the method comprising:

determining a number of uplink receiving antennas of the base station;

determining, based on the number of uplink receiving antennas of the base station and a number of uplink transmitting antennas of a terminal device, whether the number of uplink receiving antennas of the base station is limited;

with a purpose of maximizing uplink carrier aggregation traffic, determining, based on a number of effective uplink receiving antennas of the base station, an effective uplink bandwidth and uplink channel condition, the number of uplink transmitting antennas after a change by the terminal device; and in response to the number of uplink receiving antennas of the base station being limited, transmitting an antenna number change instruction to the terminal device, wherein the antenna number change instruction is used for instructing the terminal device to change the number of uplink transmitting antennas.

\* \* \* \* \*